(12) United States Patent
Thomas

(10) Patent No.: US 10,904,614 B1
(45) Date of Patent: Jan. 26, 2021

(54) COMPUTER-IMPLEMENTED COMPETITION GENERATING SYSTEM AND METHODS

(71) Applicant: Glenn Roy Thomas, San Jose, CA (US)

(72) Inventor: Glenn Roy Thomas, San Jose, CA (US)

( * ) Notice: Subject to any disclaimer, the term of this patent is extended or adjusted under 35 U.S.C. 154(b) by 0 days.

(21) Appl. No.: 16/583,813

(22) Filed: Sep. 26, 2019

(51) Int. Cl.
| | |
|---|---|
| *H04N 21/442* | (2011.01) |
| *H04N 21/475* | (2011.01) |
| *H04N 21/4784* | (2011.01) |
| *H04N 21/478* | (2011.01) |
| *G06F 16/735* | (2019.01) |

(52) U.S. Cl.
CPC ..... *H04N 21/44204* (2013.01); *G06F 16/735* (2019.01); *H04N 21/4758* (2013.01); *H04N 21/4781* (2013.01); *H04N 21/4784* (2013.01)

(58) Field of Classification Search
CPC .............. H04N 21/4758; H04N 21/44204
See application file for complete search history.

(56) References Cited

U.S. PATENT DOCUMENTS

| | | | |
|---|---|---|---|
| 8,231,470 B2 | 7/2012 | Feeney et al. | |
| 8,725,653 B1 * | 5/2014 | Hernandez | G06Q 30/0279 705/319 |
| 9,056,251 B2 | 6/2015 | Lockton | |
| 9,076,303 B1 | 7/2015 | Park et al. | |
| 9,468,851 B1 | 10/2016 | Pieron | |
| 2008/0113815 A1 | 5/2008 | Weingardt | |
| 2012/0011575 A1 * | 1/2012 | Cheswick | H04L 63/08 726/5 |
| 2013/0181405 A1 * | 7/2013 | France, III | A63K 99/00 273/445 |
| 2014/0337077 A1 * | 11/2014 | Zsebedics | G06Q 10/063114 705/7.15 |
| 2015/0182840 A1 * | 7/2015 | Regala | G16H 20/70 434/247 |
| 2015/0186751 A1 * | 7/2015 | Mosier | G06F 16/51 382/165 |
| 2015/0222945 A1 * | 8/2015 | Jackson | H04N 21/6125 725/61 |

(Continued)

FOREIGN PATENT DOCUMENTS

WO WO-2009092140 A1 * 7/2009 ............. G06Q 10/00

*Primary Examiner* — Robert J Hance
(74) *Attorney, Agent, or Firm* — Patentfile, LLC; Bradley C. Fach; Steven R. Kick

(57) ABSTRACT

A universal competition generating system and method are provided which may be configured to enable users to create competition events which may each have one or more competition tasks that establish or describe a competition behavior they want done or performed by one or more users. Users performing the competition tasks may record the competition task behavior as a completion proof via their client device by saving a picture, video, and/or other digital media, preferably with accompanying text description to a system database for retrieval. This uploading of proof is a "completion", and the system may screen and accept only unique completion proofs as satisfying the competition task(s) of a competition event to prevent fraud. The completion proofs submitted by the users and the data associated with them may be used by the system to rank the users and groups thereby enabling competition between the users and/or groups.

9 Claims, 7 Drawing Sheets

(56) References Cited

U.S. PATENT DOCUMENTS

| | | | |
|---|---|---|---|
| 2017/0083950 A1* | 3/2017 | Fitts | G06Q 30/0269 |
| 2017/0277699 A1* | 9/2017 | Miller | H04N 21/251 |
| 2018/0197172 A1* | 7/2018 | Coburn | A63F 13/792 |

* cited by examiner

COMPUTER-IMPLEMENTED COMPETITION GENERATING SYSTEM AND METHODS

FIELD OF THE INVENTION

This patent specification relates to the field of systems and methods for enabling competition between users of electronic devices. More specifically, this patent specification relates to computer implemented systems and methods enabling simultaneous competition in the completion of one or more tasks or behaviors between users of electronic devices.

BACKGROUND

Competition is a trait common to the human experience. People have been finding ways to compete with each other since time immemorial. Competition has many benefits which may include: determining individual(s) that excel at certain skills or actions; fostering comradery between individuals; spurring to become better at certain skills or actions; and behavior modification of individuals.

While users of electronic devices are able to compete against each other, they are limited by the activities that they are able to compete in. For example, individuals may play games and compete against each other via their electronic devices, the competition is limited to the games and activities programmed by the software developers. Currently, there is no system or method which provides a universal easy way to form groups, to challenge others for competitions, and compute the winner.

Therefore, a need exists for novel computer-implemented systems and methods for enabling competition between users of electronic devices. A further need exists for novel computer-implemented systems and methods that are configured for enabling simultaneous competition in the completion of one or more tasks or behaviors between users of electronic devices. There is also a need for novel computer-implemented systems and methods that are configured to provide a universal easy way to form groups, to challenge others for competitions, and compute the winner.

BRIEF SUMMARY OF THE INVENTION

A competition generating system and method are provided which may be configured to enable users to create competition events which may each have one or more competition tasks that establish or describe a competition behavior they want done or performed by one or more users. Users performing the competition tasks may record the competition task behavior as a completion proof via their client device by saving a picture, video, and/or other digital media, preferably with accompanying text description to a system database for retrieval. This uploading of proof is a "completion", and the system may accept completion proofs as satisfying the competition task(s) of a competition event. The completion proofs submitted by the users and the data associated with them may be used by the system to rank the users and groups thereby enabling competition between the users and/or groups.

According to one embodiment consistent with the principles of the invention, a computer implemented method for generating competition between individual users, each competing user having a client device, is provided. In some embodiments, the method may include the steps of: receiving input describing a competition event, the competition event having a competition task; providing the competition event to the client device of one or more competing users; receiving completion proofs of the competition task submitted by the one or more competing users via their respective client device; accepting completion proofs as satisfying the competition task; and ranking the one or more competing users.

According to another embodiment consistent with the principles of the invention, a computer implemented method for generating competition between groups of two or more users, each competing user having a client device, is provided. In some embodiments, the method may include the steps of: receiving input describing a competition event, the competition event having a competition task; providing the competition event to two or more groups of one or more competing users via their respective client devices; receiving completion proofs of the competition task submitted by the one or more competing users via their respective client devices; accepting completion proofs as satisfying the competition task; and ranking the two or more groups of competing users.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
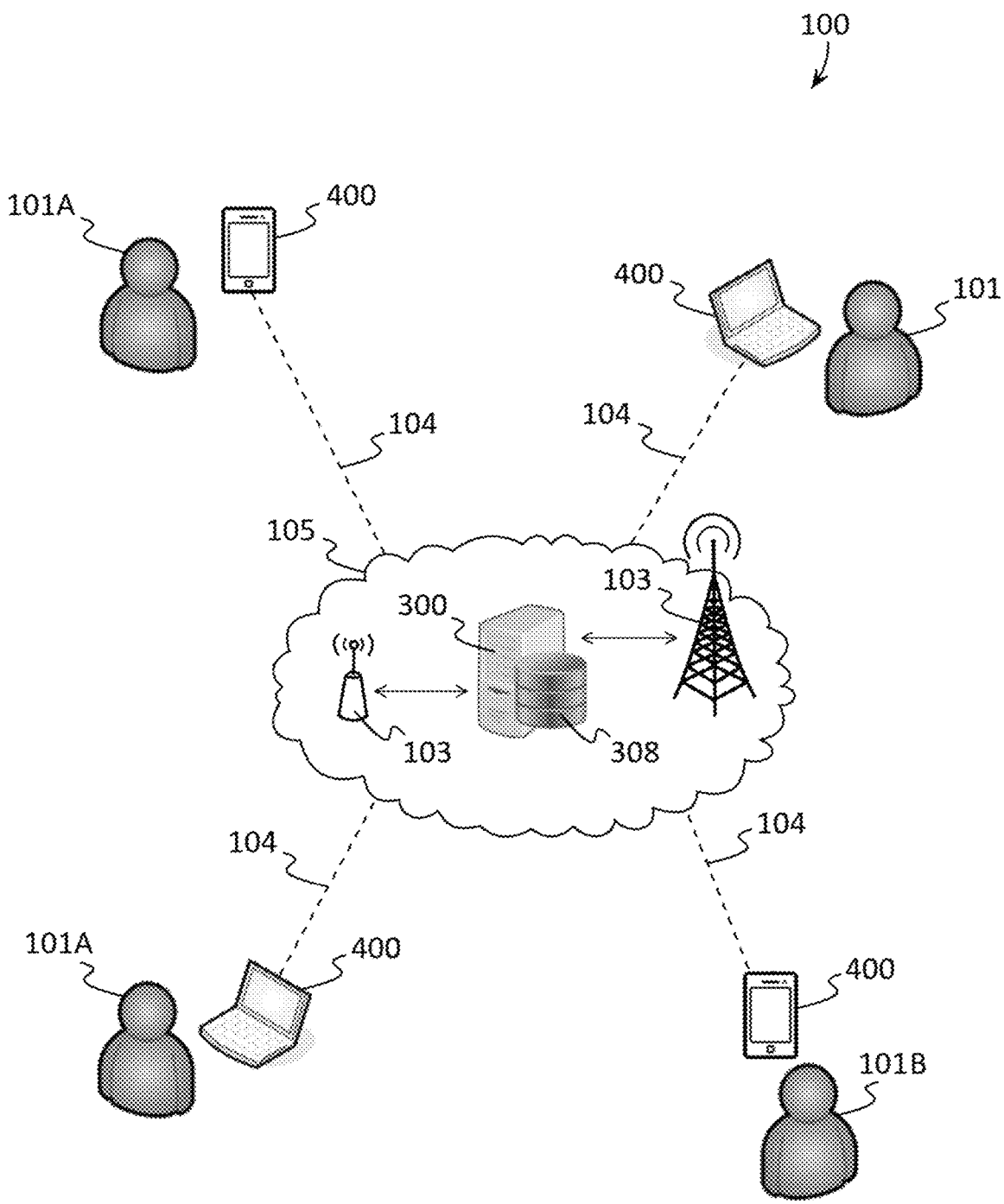
FIG. 1 depicts an illustrative example of some of the components and computer implemented methods which may be found in a competition generating system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code", "source code", "script", or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, servers, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, servers, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigbee network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for enabling competition between users are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a competition generating system ("the system") 100 according to some embodiments is presented. The system 100 is configured to facilitate the transfer of data and information between one or more access points 103, client devices 400, and servers 300 over a data network 105. Each client device 400 may send data to and receive data from the data network 105 through a network connection 104 with an access point 103. A data store 308 accessible by the server 300 may contain one or more databases. The data may comprise any information one or more users 101 may input into the system 100 via a client device 400 including information on or describing one or more users 101, information on or describing one or more competition events 121, information on or describing one or more competition tasks 122, information on or describing one or more completion proofs 123, information requested by one or more users 101, information supplied by one or more users 101, and any other information which may be used to enable competition in the completion of competition events between users 101.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

In some embodiments, the system 100 may be configured to facilitate the communication of information to and from one or more users 101, through their respective client devices 400, and servers 300 of the system 100. Users 101 of the system 100 may include one or more competing users 101A and one or more group creators 101B. A competing user 101A may comprise an individual that desires to perform one or more competition tasks 122 or behaviors which may be recorded by a client device 400 and submitted to the system 100 as competition proofs 123. A group creator 101B may comprise an individual, preferably a competing user 101A, that may invite or otherwise motivate two or more competing users 101A to be associated together in the system 100 as a group.

In preferred embodiments, the system 100 may be configured to enable users 101 to create competition events 121 which may each have one or more competition tasks 122 that establish or describe a competition behavior they want done or performed by one or more users 101. Users 101 performing the competition tasks 122 may record the competition task 122 behavior as a completion proof 123 via their client device 400 by saving a picture, video, and/or other digital media, preferably with accompanying text description to a system database 120 for retrieval. This uploading of proof is a "completion", and the system 100 may accept completion proofs 123 as satisfying the competition task(s) 122 of a competition event 121. The completion proofs 123 submitted by the users 101 and the data associated with them may be used to rank the users 101 and groups 125 of the system 100 thereby enabling competition between the users 101 and groups 125.

In further embodiments, the system 100 may provide an interface on a display screen 404A of a client device 400, via a communication engine 133, that allows the user 101 to choose to challenge no-one, only one person, multiple people, one group, multiple groups, or open up a competition event 121 to the entire world and save their input to a system database 120 for retrieval.

In further embodiments, the system 100 may be configured to rank the users 101 and the groups that the users 101 may be associated with to enable the users 101 to compete by comparing their rankings. In preferred embodiments, users 101 may be ranked a ratio of the number of completion proofs 123 submitted to the number of competition events 121 provided to a respective competing user. In further embodiments, groups may establish their winning by showing the most completion proofs 123 within its group, which may be referred to as the "completion rate" so that the groups may be ranked by their completion rates. The system 100 may be configured to compute the completion rates, displays the results via the client devices 400, and identify the winners via the client devices 400. In further embodiments, the system 100 may be configured to identify a win by identifying the groups having the same completion rate, with the group having the larger number of members completing the competition task 122 determined as the winner.

In some embodiments, the system 100 may enable all groups and/or users 101 to view each other's completion proofs 123 for verification through the retrieval from the system database 120. In preferred embodiments, the system 100 may not allow duplication of completion proof 123 so that all completion proofs 123 must be unique in order to reduce cheating.

Figure 2:
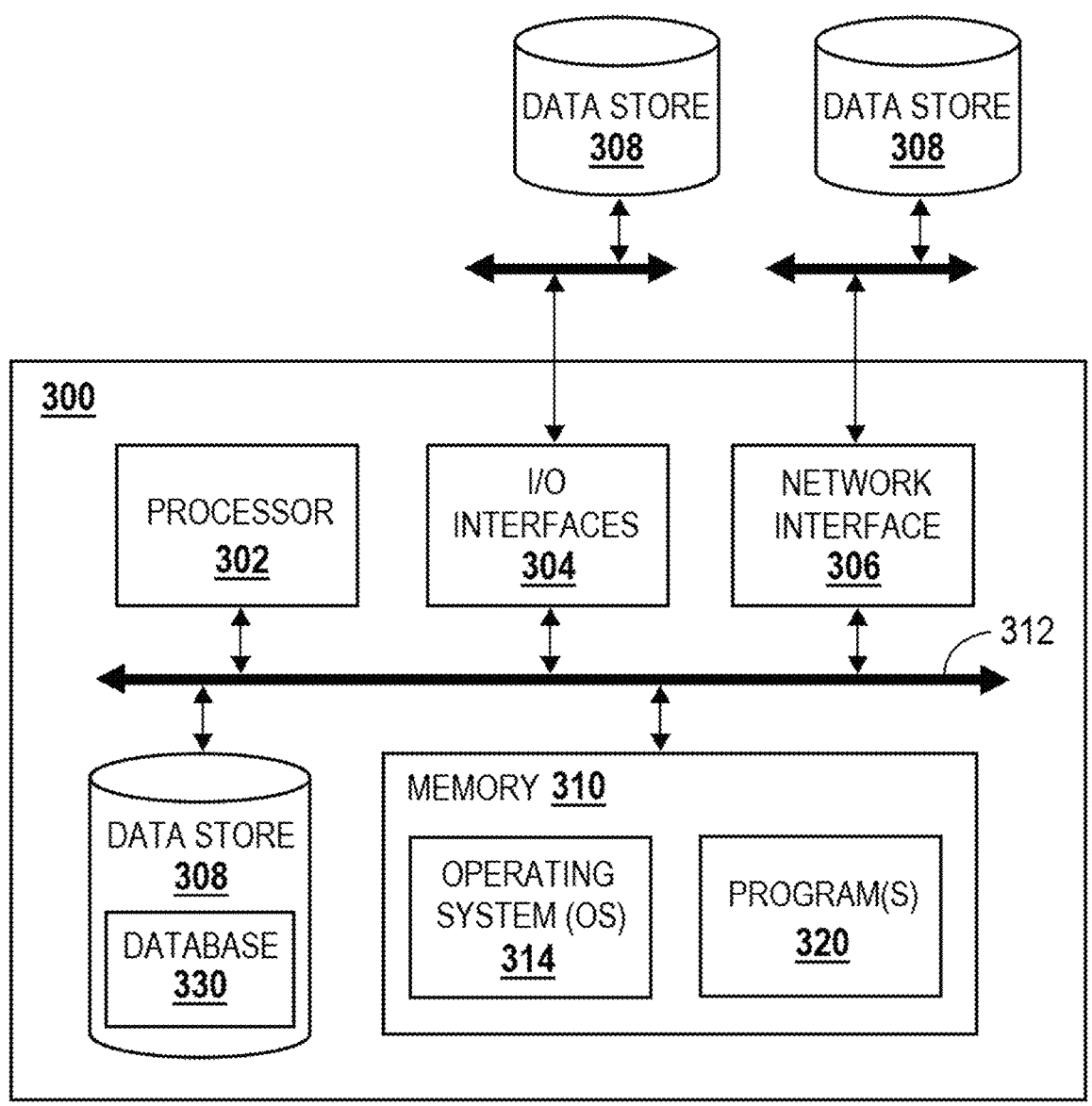
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008/2012/2016 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The one or more programs 320 may be configured to implement the various processes, algorithms, methods, techniques, etc. described herein.

Figure 3:
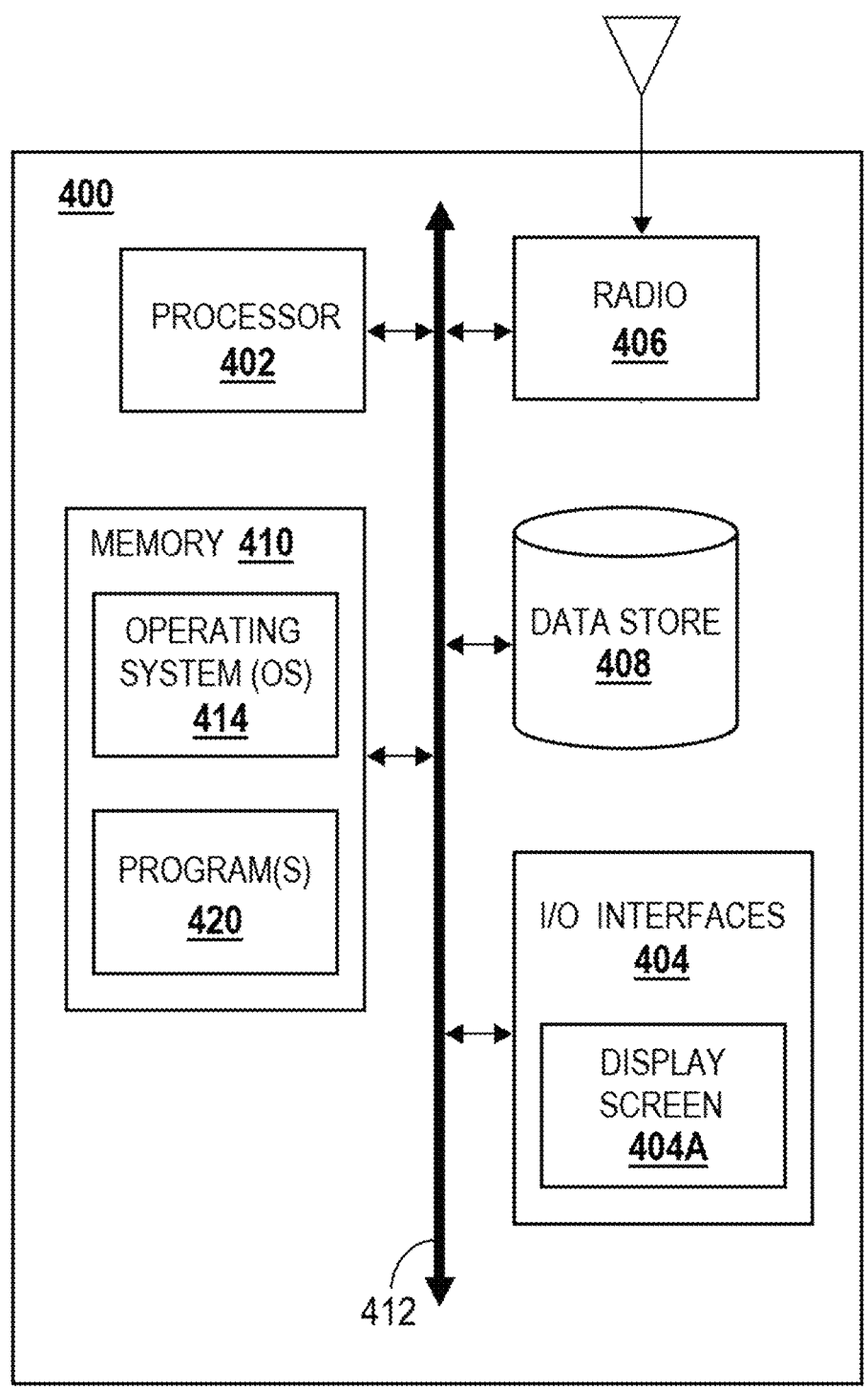
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but are not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
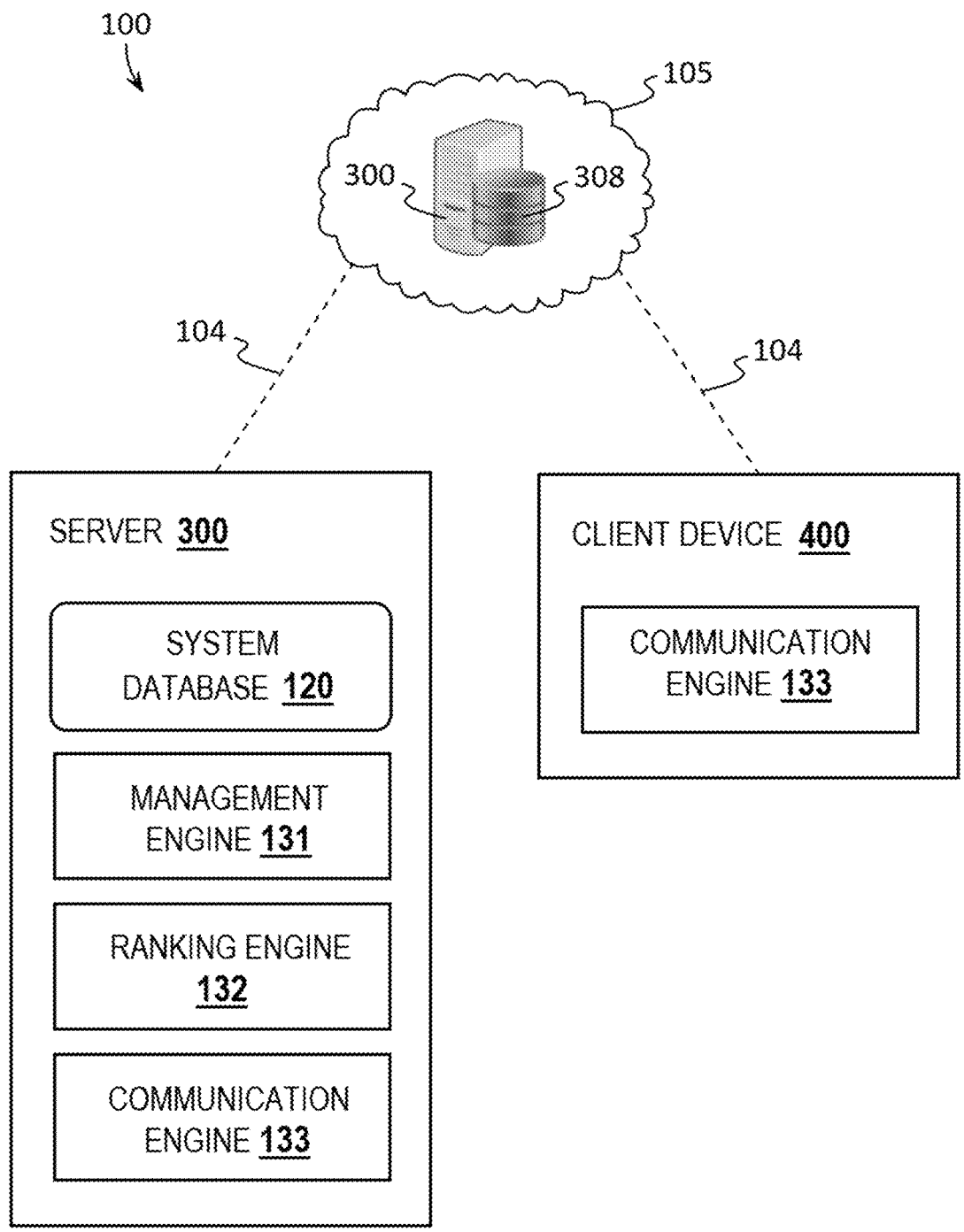
FIG. 4 depicts a block diagram illustrating some applications of a competition generating system which may function as software rules engines according to various embodiments described herein.
Figure 5:
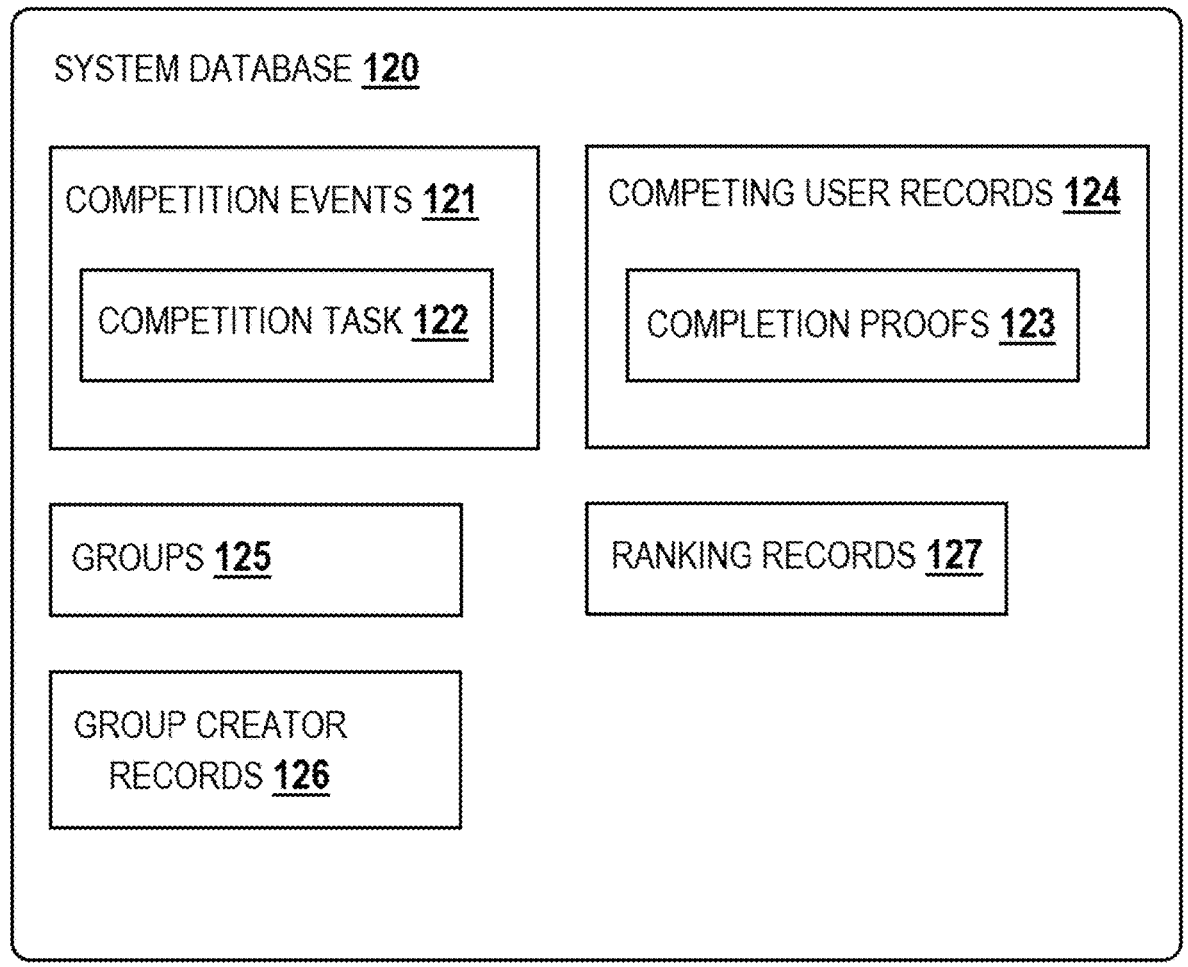
FIG. 5 illustrates a block diagram illustrating an example of a system database according to various embodiments described herein.

Referring now to FIG. 4 a block diagram showing some software rules engines and components which may be found in a system 100 and which may optionally be configured to run on one or more servers 300 and/or client devices 400 according to various embodiments described herein are illustrated. A server 300 and client device 400 may be in wired and/or wireless electronic communication through a network 105 with a data store 308. The engines 131, 132, 133, of the system 100 may be in electronic communication so that data may be readily exchanged between the engines 131, 132, 133, and one or more engines 131, 132, 133, may read, write, or otherwise access data in one or more databases 120 of one or more data stores 308.

In this and some embodiments, one or more servers 300 may be configured to run one or more software rules engines or programs such as a management engine 131, ranking engine 132, and communication engine 133, while a client device 400 may be configured to run one or more software rules engines or programs such as a communication engine 133. In other embodiments, a management engine 131, ranking engine 132, and communication engine 133, may be configured to run on one or more client devices 400 and/or servers 300 with data transferred to and from a management engine 131, ranking engine 132, and/or communication engine 133, that may be in communication with a data store 308 through a network 105. It should be understood that the functions attributed to the engines 131, 132, 133, described herein are exemplary in nature, and that in alternative embodiments, any function attributed to any engine 131, 132, 133, may be performed by one or more other engines 131, 132, 133, or any other suitable processor logic.

The system 100 may comprise one or more databases, such as a system database 120, which may be stored on a data store 308 accessible to one or more engines 131, 132, 133. In some embodiments, a system database 120 may comprise information that one or more users 101 desire to input into the system 100 including information provided by one or more users 101, such as information on or describing one or more users 101, information on or describing one or more competition events 121, information on or describing one or more competition tasks 122, information on or describing one or more completion proofs 123, information requested by one or more users 101, information supplied by one or more users 101, and any other information which may be used to enable competition in the completion of competition events between users 101. It should be understood that the described structure of the system database 120 is exemplary in nature, and that in alternative embodiments, the data contained within the system database 120 may be organized in any other way.

In preferred embodiments, a system database 120 may comprise one or more, such as a plurality of, competition event 121 data records. Generally, a competition event 121 may comprise an event or scenario which a user 101 may desire to enter into the system 100 for the purpose of determining a winner and/or for the purpose of ranking the ability of one or more competing users 101A to complete one or more behaviors. Each competition event 121 may comprise one or more competition tasks 122, the completion of which may be used by the system 100 to determine a winner and/or ranking the one or more competing users 101A.

A competition event 121 data record may comprise data describing the competition event 121, such as: the name; start date; end date; purpose of the event; prize for the winning competing user(s) 101A; prize for the one or more ranking competing user(s) 101A; audio and/or visual data, or any other information; one or more competing users 101A that have been invited to participate in the event; one or more competing users 101A that have indicated that they are participating in the event, and any other information that a user 101 may input into the system 100 related to the competition event 121 via a client device 400. For example, a competition event 121 may comprise a donation challenge, and the competition event 121 data record may comprise data including: the name of the donation challenge as "Suzy's Domestic Violence Shelter Help"; start date of Jan. 1, 2020; end date of May 1, 2020; purpose of getting five other people to donate at least ten dollars for a domestic violence shelter; prize of a dinner hosted by one or more competing user(s) 101A participating in the competition event 121; a video advertisement for the event recorded by Suzy; the contact information of the competing users 101A that have been invited to participate in the event; and the contact information of the competing users 101A that have indicated that they are participating in the event.

A competition event 121 data record may also comprise one or more competition tasks 122 which may describe a behavior that a competing user 101A must perform in order to complete or satisfy the competition event 121. A competition task 122 may comprise any behavior that a competing user 101A is able to perform. Example competition tasks 122 include: attending practice sessions, eating healthy meal(s), finding an item, purchasing an item, performing a good deed, etc., the completion of which may be used by the system 100 to determine a winner and/or ranking the one or more competing users 101A.

As an example, a competition event 121 data record may comprise a competition task 122 for competing users 101A to provide still images and/or videos of the competing users 101 providing food for street kids in Melbourne, Australia between Nov. 5, 2019 and Nov. 12, 2019, and still images and/or videos of the competing users 101 providing food for street kids in Melbourne, Australia between Nov. 5, 2019 and Nov. 12, 2019 may be uploaded to the system 100 as completion proofs 123 for this competition event 121. As another example, a competition event 121 data record may comprise a competition task 122 for competing users 101A to provide still images and/or videos of the competing users 101 growing plants native to in Berlin, Germany between Sep. 1, 2020 and Sep. 30, 2020, and still images and/or videos of the competing users 101 and/or their native plants in Berlin, Germany between Sep. 1, 2020 and Sep. 30, 2020 may be uploaded to the system 100 as completion proofs 123 for this competition event 121.

The system database 120 may also comprise completion proof 123 data records which may comprise data that proves or demonstrates that a competing user 101A has performed the behavior of a competition task 122. In preferred embodiments, a completion proof 123 may comprise a still image or digital photograph of an item, competing user 101A performing a behavior, individual(s), or any other object or person which may be required by a competition task 122. In further preferred embodiments, a completion proof 123 may comprise a video or series of digital photographs of an item, competing user 101A performing a behavior, individual(s), or any other object or person which may be required by a competition task 122. In other embodiments, a completion proof 123 may comprise an audio recording or any other data which may be recorded by an I/O interface 404 of a client device 400. Example completion proofs 123 include: a picture of a competing user 101A helping a person cross the street or performing some other charitable act; a video if a competing user 101A eating a healthy meal; an audio recording of a competing user 101A singing a song; a picture of a competing user 101A finding a lost pet; a video of a competing user 101A performing a trick or other feat of skill; and a recording of a competing users 101A heart rate over a period of time. In further preferred embodiments, competing users 101A of the system 100 may access completion proof 123 data records of other competing users 101A via their client device 400, such as to verify that the completion proofs 123 are valid.

In some embodiments, a system database 120 may one or more competing user records 124. Generally, a competing user record 124 may comprise data describing a competing user 101A of the system 100. This data may include: identifying information for one or more client devices 400 of the competing user 101A; system login or credential information; contact addresses; payment information; pictures or other avatars; contacts including social media contacts of the competing user 101A; and any other information describing the competing user 101A.

In some embodiments, a system database 120 may one or more group 125 data records. Generally, a group 125 may comprise data describing two or more competing users 101A that are associated together in the system 100. For example, a group 125 data record may comprise five competing users 101A that may be competing in the system 100 as a team or group. A competing user 101A may be associated with any number of groups 125 and each competing user 101A may compete in the system 100 as an individual or as part of a group depending on the input describing a competition event 121 as entered by the user 101 creating that competition event 121. Each group 125 data record may comprise a group creator record 136 which may comprise data describing the competing user(s) 101A that are acting as the group creator(s) 101B. Group creators 101B may send invitations to competing users 101A to join a group 125 that the group creator 125 has created in the system 100.

In preferred embodiments, a system database 120 may comprise one or more, such as a plurality of, ranking records 127. Generally, a ranking record 127 may comprise data describing the rank of two or more competing users 101A and/or groups 125 relative to each other. In some embodiments, a ranking record 127 may comprise data describing the rank of two or more competing users 101A and/or groups 125 in completing a competition event 121 and/or a competition task 122. In further embodiments, a ranking record 127 may comprise data describing the rank of two or more competing users 101A and/or groups 125 in cumulatively completing competition tasks 122 of two or more competition events 121 that the competing users 101A and/or groups 125 have been able to participate in. In further embodiments, a ranking record 127 may comprise data describing the rank of two or more competing users 101A and/or groups 125 by the earliest time at which each competing user 101A and/or group 125 submits a completion proof 123 for a competition event 121 and/or a competition task 122. In further embodiments, a ranking record 127 may comprise data describing the rank of two or more competing users 101A and/or groups 125 by a ratio of the number of completion proofs 123 submitted to the number of competition events 121 provided to a respective competing user 101A and/or groups 125.

The system 100 may comprise one or more management engines 131. A management engine 131 may comprise or function as management logic stored in a memory 310, 410, which may be executable by the processor 302, 402, of a server 300 and/or client device 400. In some embodiments, a management engine 131 may operate according to one or more logic rules which may control the entry, modification, and retrieval of data of the one or more system databases 120. For example, the management engine 131 may control the entry, modification, and retrieval of competition events 121, competition tasks 122, completion proofs 123, competing user records 124, groups 125, group creator records 126, and ranking records 127 of a system database 120.

In further embodiments, a management engine 131 may be configured to receive completion proofs 123 of competition tasks 122 submitted by one or more competing users 101A, and the management engine 131 may also be configured to accept completion proofs 123 of competing users 101A as satisfying the competition task 122. Generally, the management engine 131 may accept completion proofs 123 of competing users 101A as satisfying the competition task 122 that satisfy time and date requirements of a competition event 121; that satisfy the type of completion proof 123 (video, picture, audio, etc.) requirements of a competition event 121; that satisfy which competing users 101A may submit a completion proof 123 for a competition event 121; and/or any other requirements for a completion proof 123 of a competing user 101A to satisfy the competition task(s) 122 of a competition event 121.

In preferred embodiments, the management engine 131 may also be configured to screen completion proofs 123 to prevent fraudulent completion proofs 123 from being accepted as satisfying the competition task(s) 122 of a competition event 121. In some embodiments, the management engine 131 may screen received completion proofs 123 for substantially matching completion proofs 123 so that competing users 101A may not copy and submit each other's completion proofs 123. A management engine 131 may screen completion proofs 123 using image matching coding and/or cloud service, video matching coding and/or cloud service, audio matching coding and/or cloud service, and/or any other integrated and/or third-party digital file matching method. In still further embodiments, any subsequent completion proof 123 received or screened by the management engine 131 that substantially matches a first received completion proof 123 may not be accepted by the management engine 131 as satisfying the competition task 122 that it was submitted in response to.

The system 100 may comprise one or more ranking engines 132. A ranking engine 132 may comprise or function as ranking logic stored in a memory 310, 410, which may be executable by the processor 302, 402, of a server 300 and/or client device 400. A ranking engine 132 may use any criteria for ranking two or more users 101 and/or groups 125 of users 101.

For example, in some embodiments, a ranking engine 132 may the following variables as criteria for ranking two or more users 101 and/or groups 125 of users 101:

GCI=unique group creator 101B identifier

G=number of groups 125 competing

G #=the total number of groups 125 as group identifier integer (from 1 to #G), assigned by system 100 according to a creation time stamp

C=number of completions within a group 125 (number of completion proofs 123 accepted by the system 100)

N=number of users 101 in a particular group 125

N #=the integer identifier for a specific user 101 member within a particular group 125

BCR #=basic completion rate for a specific group 125

GCI(IRS #)=the individual ranking status of the group's creator 101B=the total number of all completes in all competition events 121 created by the group's creator 101B FR #=the system 100 ranking for the group 125 competing in the specific competition event 121

Proof of completion for each user 101 member=unique digital picture or video (performed to reduce the risk of users 101 copying other user's 101 proof of completion proofs 123 to keep users 101 from cheating)

COMPLETION RATE #C and X are initialized to 0,

C=(from (X=X+1) to #N) repeat, ((User's 101 completion proof 123 still image or video is processed using matching system, if completion proof 123 still image or video is unique) then #C=#C+1

C/#N=BCR Basic Completion Rate (the number of completing users 101 within specific group/total number of member users 101 within specific group 125 G #)

The ranking engine 132 may perform any number of rankings on the groups 125. For example, a ranking engine 132 may perform a first ranking on two or more groups 125 as follows:

Each groups' 125 BCR is compared for first pass ranking by the ranking engine 132—repeat from x=1 to max G #, where if x(BCR)>((x+1)(BCR)) then xR #=+1

This results in a basic completion rate ranking on all the competing groups 125—however, there may be some groups 125 with equal BCR Now the ranking engine 132 may perform a second ranking on the two or more groups 125 having the same BCR as follows:

In a second ranking may be between two groups 125 with equal BCR then the group 125 with the most member users 101 providing a completion proof 123 for a competition event 121 wins the ranking:

repeat from x=1 to #G, if x(BCR)=(x+1)(BCR), then Equal BCR groups=(y1, y2, . . . )

then if y1 (#C)>y2(#C) then y1=higher ranking than y2

Now the ranking engine 132 may perform a third ranking on the two or more groups 125 having the same BCR and the same number of completing users 101, then the winner is the group 125 having the group creator 101B with the highest IRS # (the individual ranking status of the groups creator 101B).

if y1 (IRS #) is >than (y2, y3, . . . ) then y1 has higher FR #than (y2, y3, . . . )

It is possible for one or more users 101 and/or groups 125 of the system 100 to have the same ranking. For example, if after the third sort two groups 125 have equal FR #, then they are assigned the same FR #, and have equal ranking for the particular competition event 121.

In some embodiments, a ranking engine 132 may be configured to rank competing users 101A and/or groups 125 and data describing the ranking may be stored in one or more ranking records 127. In some embodiments, a ranking engine 132 may be configured to rank two or more competing users 101A and/or groups 125 in completing a competition event 121 and/or a competition task 122. In further embodiments, a ranking engine 132 may be configured to rank two or more competing users 101A and/or groups 125 in cumulatively completing competition tasks 122 of two or more competition events 121 that the competing users 101A and/or groups 125 have been able to participate in. In further embodiments, a ranking engine 132 may be configured to rank two or more competing users 101A and/or groups 125 by the earliest time at which each competing user 101A and/or group 125 submits a completion proof 123 for a competition event 121 and/or a competition task 122. In further embodiments, a ranking engine 132 may be configured to rank two or more competing users 101A and/or groups 125 by a ratio of the number of completion proofs 123 submitted to the number of competition events 121 provided to a respective competing user 101A and/or group 125.

In further preferred embodiments, a ranking engine 132 may be configured to perform two or more second rankings on two or more competing users 101A and/or groups 125 when the competing users 101A and/or groups 125 earn the same ranking in a first ranking. For example, when two competing groups 125 earn the same ranking in a first ranking that may be performed a first ranking of the ratio of the number of competing users 101A of each group 125 that submit a completion proof 123. However, it should be understood that a ranking engine 132 may perform any number of rankings and that rankings may be performed in any order.

In some embodiments, the ranking engine 132 may be configured to perform a second ranking on the competing groups 125 having a same first ranking by ranking the respective competing groups 125 again by the number of competing users 101A of each group 125 that submit a completion proof 123. For example, two or more competing groups 125 having the same ration of competing users 101A of each group 125 that submit a completion proof 123 may be ranked again so that a group 125 having a greater number of competing users 101A that submitted a completion proof 123 is ranked higher than a group 125 having a lesser number of competing users 101A that submitted a completion proof 123.

In some embodiments, the ranking engine 132 may be configured to perform a second ranking on the competing groups 125 having a same first ranking by ranking the respective competing groups 125 again by the total number of competing users 101A of each group 125 that submitted a completion proof 123 that satisfied a competition task 122 for every competition event 121 created by the respective group creator 101B of each group 125. For example, two or more competing groups 125 having the same number of competing users 101A that submitted a completion proof 123 may be ranked again so that a group 125 having a group creator 101B having a higher total number of completing competing users 101B from all the competition events 121 ever created by that creator group creator 101B is ranked higher than a group 125 having a group creator 101B having a lower total number of completing competing users 101B from all the competition events 121 ever created by that creator group creator 101B.

In some embodiments, the ranking engine 132 may be configured to perform a second ranking on the competing groups 125 having a same first ranking by ranking the respective competing groups 125 again by a ratio describing the number of completion proofs 123 submitted by each group creator 101B of the same ranking groups 125 to the number of competition events 121 provided to a respective group creator 101B. For example, two or more competing groups 125 having the same number of competing users 101A that submitted a completion proof 123 may be ranked again so that a group 125 having a greater ratio describing the number of completion proofs 123 submitted by that group creator 101B to the number of competition events 121 provided to that respective group creator 101B is ranked higher than a group 125 having a lesser ratio describing the number of completion proofs 123 submitted by that group creator 101B to the number of competition events 121 provided to that respective group creator 101B.

The system 100 may comprise one or more communication engines 133. A communication engine 133 may comprise or function as communication logic stored in a memory 310, 410, which may be executable by the processor 302, 402, of a server 300 and/or client device 400. In some embodiments, a communication engine 133 may be configured to enable electronic communication between one or more client devices 400 and servers 300 of the system 100. For example, electronic communication between client devices 400 and servers 300 of the system 100 may be enabled by communication engines 133 running on the respective client devices 400 and servers 300.

In further embodiments, a communication engine 133 may be configured to operate an I/O interface 404, such as a display screen 404A (optionally of a touchscreen interface), of a client device 400 operated by a user 101 in order to provide to and receive information from the user 101. For example, a user 101 may enter information describing competition events 121, competition tasks 122, and completion proofs 123 via a communication engine 133 running on their client device 400. As another example, a communication engine 133 may display rankings of the users 101 and groups 125 of the system 100 to a user via a display screen 404A of the user's 101 client device 400.

Figure 6:
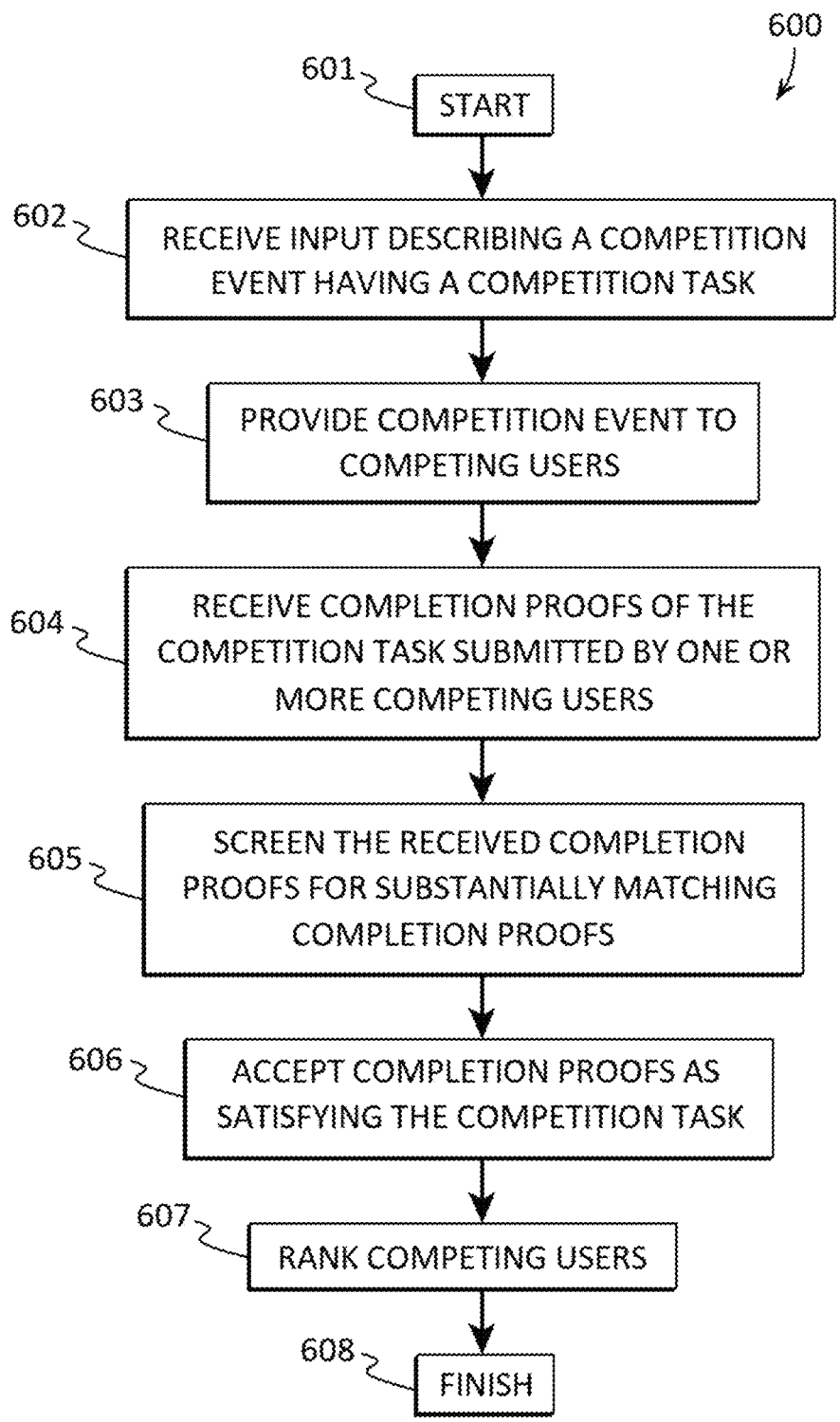
FIG. 6 shows a block diagram of an example of a computer-implemented individual competition generating method according to various embodiments described herein.

FIG. 6 shows a block diagram of an example of a computer-implemented individual competition generating method ("the method") 600 according to various embodiments described herein. In some embodiments, the method 600 may be used to enable the communication of information between the client devices 400 of one or more users 101 to enable the users 101 to compete with each other based on ranking the users 101 on various factors describing their ability to provide completion proofs 123 satisfying the competition task(s) 122 of one or more competition events 121. One or more steps of the method 600 may be performed by a management engine 131, ranking engine 132, and/or communication engine 133 which may be executed by a computing device processor, such as a processor 302 of a server 300 and/or a processor 402 of a client device 400. The steps of the method 600 are not limited to the following order.

The method may start 601, and the system 100 may receive input describing a competition event 121 having one or more competition tasks 122 in step 602. In some embodiments, a user 101, such as a competing user 101A or a group creator 101B may provide input, via their client device 400, which may contain data describing a competition event 121 to a communication engine 133 running on their client device 400 and the communication engine 133 may provide the data to a management engine 131 of a server 300, optionally via a communication engine 133 running on the server 300.

The management engine 131 may store the data of the competition event 121 in the system database 120 as a data record. A competition event 121 data record may comprise data describing the competition event 121, such as: the name; start date; end date; purpose of the event; prize for the winning competing user(s) 101A; prize for the one or more ranking competing user(s) 101A; audio and/or visual data, or any other information; one or more competing users 101A that have been invited to participate in the event; one or more competing users 101A that have indicated that they are participating in the event, and any other information that a user 101 may input into the system 100 related to the competition event 121 via a client device 400. A competition event 121 data record may also comprise one or more competition tasks 122 which may describe a behavior that a competing user 101A must perform in order to complete or satisfy the competition event 121. A competition task 122 may comprise any behavior that a competing user 101A is able to perform and which data describing the performance is able to be recorded by an I/O interface 404 of a client device 400 of the competing user 101A.

In step 603, the competition event 121 may be provided to the client devices 400 of one or more competing users 101B. Preferably, a competition event 121 may be provided to the competing users 101B by a communication engine 133 providing data describing the competition event 121 to the communication engine 133 running on the client devices 400 of the one or more competing users 101B. This data may include one or more competition tasks 122.

In step 604, one or more completion proofs 123 of the competition task 122 may be submitted by the one or more competing users 101B and received by the system 100. In some embodiments, a communication engine 131 running on a server 300 may receive the completion proofs 123 from the communication engine 131 running on the client device 400 of the submitting competing users 101A. Generally, a completion proof 123 may comprise data recorded by an I/O interface 404 of a client device 400 of the competing user 101A that proves or demonstrates that a competing user 101A has performed the behavior of a competition task 122. In preferred embodiments, a completion proof 123 may comprise a video and/or a still image. In some embodiments, completion proofs 123 received in step 604 may be stored in the system database 120 and preferably may be accessible for viewing by one or more competing users 101A.

In some embodiments, the method 600 may optionally comprise step 605 in which the received completion proofs 123 may be screened for substantially matching completion proofs 123 by a management engine 131. In preferred embodiments, a management engine 131 may be configured to screen completion proofs 123 to prevent fraudulent completion proofs 123 from being accepted as satisfying the competition task(s) 122 of a competition event 121. In some embodiments, the management engine 131 may screen received completion proofs 123 for substantially matching completion proofs 123 so that competing users 101A may not copy and submit each other's completion proofs 123. In still further embodiments, any subsequent completion proof 123 received or screened by the management engine 131 that substantially matches a first received completion proof 123 may not be accepted by the management engine 131 as satisfying the competition task 122 that it was submitted in response to.

In some embodiments, if the data of a second received completion proof 123 matches 98 to 100 percent of the data of a first received completion proof 123, then the second or subsequent completion proof 123 may not be accepted by the management engine 131 as satisfying the competition task 122 that it was submitted in response to. For example, if a completion proof 123 comprising a photo or video is copied by a competing user 101A and submitted as a completion proof 123 and the management engine 131 determines that the photo or video of the completion proof 123 substantially matches an earlier submitted photo or video completion proof 123, then the management engine 131 may screen the substantially matching completion proof 123 and not accept it as satisfying the competition task 122.

In step 606, the one or more completion proofs 123 may be accepted as satisfying the competition task 122 by a management engine 131. In some embodiments, the management engine 131 may accept completion proofs 123 of competing users 101A as satisfying the competition task 122 that satisfy time and date requirements of a competition event 121; that satisfy the type of completion proof 123 (video, picture, audio, etc.) requirements of a competition event 121; that satisfy which competing users 101A may submit a completion proof 123 for a competition event 121; and/or any other requirements for a completion proof 123 of a competing user 101A to satisfy the competition task(s) 122 of a competition event 121. In some embodiments, submitted completion proofs 123 accepted in step 606 may be stored in the system database 120 and preferably may be accessible for viewing by one or more competing users 101A.

In step 607, the one or more competing users 101A may be ranked by a ranking engine 132. The ranking engine 132 may use any criteria to rank the competing users 101A. In some embodiments, the competing users 101A may be ranked by the earliest time at which each competing user 101A submits a completion proof 123. For example, a first competing user 101A that submits and/or has a completion proof 123 accepted at an earlier time than a second competing user 101A may be ranked higher than the second competing user 101A. In further embodiments, each competing user 101A may be ranked by a ratio describing the number of completion proofs 123 submitted by a respective competing user 101A to the number of competition events 121 provided to that respective competing user 101A. For example, a first competing user 101A that has a ratio describing the number of completion proofs 123 submitted by a respective competing user 101A to the number of competition events 121 provided to that respective competing user 101A of 1 (ratio describing that on average the first competing user 101A provides one accepted completion proof 123 for every one competition events 121 received) may be ranked higher than a second competing user 101A having a ratio describing the number of completion proofs 123 submitted by a respective competing user 101A to the number of competition events 121 provided to that respective competing user 101A of 0.5 (ratio describing that on average the second competing user 101A provides one accepted completion proof 123 for every two competition events 121 received). The rankings of the competing users 101A may be stored in the system database 120 and may be accessible for viewing by the competing users 101A via a communication engine 133 and their respect client device 400. Step 606 may comprise any number of rankings which may be performed by a ranking engine 132 in order to rank the competing users 101A in the system 100. For example, if a first ranking results in two or more competing users 101A having the same ranking, the competing users 101A having the same ranking may be ranked again by a different set of criteria by a ranking engine 132 so that the two or more competing users 101A may have different rankings.

After step 607, the method 600 may finish 608.

Figure 7:
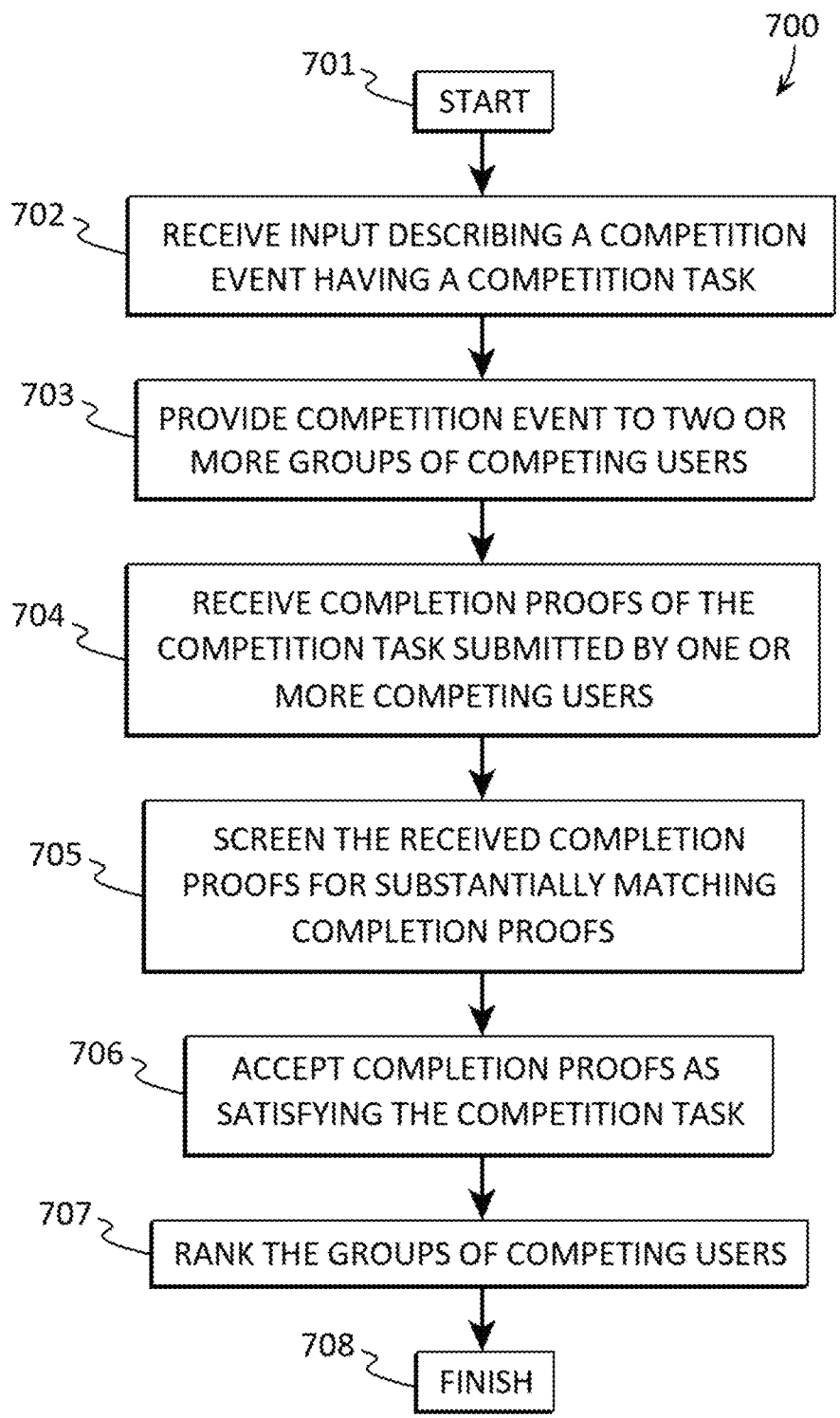
FIG. 7 depicts a block diagram of an example of a computer-implemented group competition generating method according to various embodiments described herein.

FIG. 7 shows a block diagram of an example of a computer-implemented group competition generating method ("the method") 700 according to various embodiments described herein. In some embodiments, the method 700 may be used to enable the communication of information between the client devices 400 of one or more users 101 to enable two or more groups of competing users 101A to compete with each other based on ranking the groups 125 and/or users 101 on various factors describing their ability to provide completion proofs 123 satisfying the competition task(s) 122 of one or more competition events 121. One or more steps of the method 700 may be performed by a management engine 131, ranking engine 132, and/or communication engine 133 which may be executed by a computing device processor, such as a processor 302 of a server 300 and/or a processor 402 of a client device 400. The steps of the method 700 are not limited to the following order.

The method may start 701, and the system 100 may receive input describing a competition event 121 having one or more competition tasks 122 in step 702. In some embodiments, a user 101, such as a competing user 101A or a group creator 101B may provide input, via their client device 400, which may contain data describing a competition event 121 to a communication engine 133 running on their client device 400 and the communication engine 133 may provide the data to a management engine 131 of a server 300, optionally via a communication engine 133 running on the server 300.

The management engine 131 may store the data of the competition event 121 in the system database 120 as a data record. A competition event 121 data record may comprise data describing the competition event 121, such as: the name; start date; end date; purpose of the event; prize for the winning competing user(s) 101A; prize for the one or more ranking competing user(s) 101A; audio and/or visual data, or any other information; one or more competing users 101A that have been invited to participate in the event; one or more competing users 101A that have indicated that they are participating in the event, and any other information that a user 101 may input into the system 100 related to the competition event 121 via a client device 400. A competition event 121 data record may also comprise one or more competition tasks 122 which may describe a behavior that a competing user 101A must perform in order to complete or satisfy the competition event 121. A competition task 122 may comprise any behavior that a competing user 101A is able to perform and which data describing the performance is able to be recorded by an I/O interface 404 of a client device 400 of the competing user 101A.

In step 703, the competition event 121 may be provided to the client devices 400 of one or more competing users 101B of two or more groups 125. Preferably, a competition event 121 may be provided to the competing users 101B by a communication engine 133 providing data describing the competition event 121 to the communication engine 133 running on the client devices 400 of the one or more competing users 101B. This data may include one or more competition tasks 122.

In step 704, one or more completion proofs 123 of the competition task 122 may be submitted by the one or more competing users 101B and received by the system 100. In some embodiments, a communication engine 131 running on a server 300 may receive the completion proofs 123 from the communication engine 131 running on the client device 400 of the submitting competing users 101A. Generally, a completion proof 123 may comprise data recorded by an I/O interface 404 of a client device 400 of the competing user 101A that proves or demonstrates that a competing user 101A has performed the behavior of a competition task 122. In preferred embodiments, a completion proof 123 may comprise a video and/or a still image. In some embodiments, completion proofs 123 received in step 704 may be stored in the system database 120 and preferably may be accessible for viewing by one or more competing users 101A.

In some embodiments, the method 700 may optionally comprise step 705 in which the received completion proofs 123 may be screened for substantially matching completion proofs 123 by a management engine 131. In preferred embodiments, a management engine 131 may be configured to screen completion proofs 123 to prevent fraudulent completion proofs 123 from being accepted as satisfying the competition task(s) 122 of a competition event 121. In some embodiments, the management engine 131 may screen received completion proofs 123 for substantially matching completion proofs 123 so that competing users 101A may not copy and submit each other's completion proofs 123. In still further embodiments, any subsequent completion proof 123 received or screened by the management engine 131 that substantially matches a first received completion proof 123 may not be accepted by the management engine 131 as satisfying the competition task 122 that it was submitted in response to.

In some embodiments, if the data of a second received completion proof 123 matches 98 to 100 percent of the data of a first received completion proof 123, then the second or subsequent completion proof 123 may not be accepted by the management engine 131 as satisfying the competition task 122 that it was submitted in response to. For example, if a completion proof 123 comprising an audio recording is copied by a competing user 101A and submitted as a completion proof 123 and the management engine 131 determines that the audio recording of the completion proof 123 substantially matches an earlier submitted photo or video completion proof 123, then the management engine 131 may screen the substantially matching completion proof 123 and not accept it as satisfying the competition task 122.

In step 706, the one or more completion proofs 123 may be accepted as satisfying the competition task 122 by a management engine 131. In some embodiments, the management engine 131 may accept completion proofs 123 of competing users 101A as satisfying the competition task 122 that satisfy time and date requirements of a competition event 121; that satisfy the type of completion proof 123 (video, picture, audio, etc.) requirements of a competition event 121; that satisfy which competing users 101A may submit a completion proof 123 for a competition event 121; and/or any other requirements for a completion proof 123 of a competing user 101A to satisfy the competition task(s) 122 of a competition event 121. In some embodiments, submitted completion proofs 123 accepted in step 706 may be stored in the system database 120 and preferably may be accessible for viewing by one or more competing users 101A.

In step 707, the one or more groups 125 of competing users 101A may be ranked by a ranking engine 132. The ranking engine 132 may use any criteria to rank the competing groups 125. The rankings of the groups 125 of competing users 101A may be stored in the system database 120 and may be accessible for viewing by the competing users 101A and/or groups 125 via a communication engine 133 and their respect client device 400.

In some embodiments, the groups 125 of competing users 101A may be ranked by the earliest time at which one or more, and more preferably all, competing users 101A of a group 125 submits a completion proof 123. For example, a first group 125 having one or more competing users 101A that submits and/or has a completion proof 123 accepted at an earlier time than one or more second competing users 101A of a second group 125 may be ranked higher than the second group 125.

In further embodiments, each competing user 101A may be ranked by a ratio describing the number of completion proofs 123 submitted by a respective competing user 101A to the number of competition events 121 provided to that respective competing user 101A. For example, a first competing user 101A that has a ratio describing the number of completion proofs 123 submitted by a respective competing user 101A to the number of competition events 121 provided to that respective competing user 101A of 0.9 (ratio describing that on average the first competing user 101A provides nine accepted completion proofs 123 for every ten competition events 121 received) may be ranked higher than a second competing user 101A having a ratio describing the number of completion proofs 123 submitted by a respective competing user 101A to the number of competition events 121 provided to that respective competing user 101A of 0.7 (ratio describing that on average the second competing user 101A provides seven accepted completion proofs 123 for every ten competition events 121 received).

Step 707 may comprise any number of rankings which may be performed by a ranking engine 132 in order to rank the groups 125 of competing users 101A in the system 100. For example, if a first ranking results in two or more groups 125 having the same ranking, the groups 125 having the same ranking may be ranked again by a different set of criteria by a ranking engine 132 so that the two or more groups 125 may have different rankings.

In some embodiments, the groups 125 of competing users 101A may be ranked by a ratio describing the number of competing users 101A of a respective group 125 that submit a completion proof 123 to the total number of competing users 101A in that respective group 125 in a first ranking. If two or more groups 125 have the same rank in the first ranking, the two or more groups 125 have the same rank may be ranked again by the number of competing users 101A of each group that submit a completion proof 123 for the competition task 122 in a second ranking. If two or more groups 125 have the same rank in the second ranking as well as in the first ranking, the two or more groups 125 have the same rank may be ranked again by, the total number of competing users 101A that submitted a completion proof 123 that satisfied a competition task 122 for every competition event 121 created by the respective group creator 101B of each group 125. For example, if after a first and second ranking, two groups 125 have the same ranks, such as if the completion ratio is the same (e.g., 50%, and the number of group 125 members (competing users 101A) who have completed the task is the same (10 completers in both groups) then the final ranking may be between the two group creators 101B—which one has the highest total number of completers from all the competition events 121 and/or competition task 122 ever created by each creator 101B. For example, a first group creator 101B has created five previous competition events 121, each having a competition task 122. The ranking engine 132 may add up all the completing competing users 101A in every one of his previous competition events 121 and have a final count of 46 completing competing users 101A from all of his competition events 121. If a second group creator 101B has a total of 87 completing competing users 101A from all of their competition events 121, then the second group 125 may be ranked higher than the first group 126.

After step 707, the method 700 may finish 708.

Example Uses of the System

The system 100 and methods described herein may be configured to enable users 101 to create competition events 121 which may each have one or more competition tasks 122 that establish or describe a competition behavior they want done or performed by one or more users 101. The following examples are provided to facilitate understanding of how the system 100 may be used and the system 100 is not limited by these examples.

As a first example, a basic competition could be two friends who want to increase motivation for donating sports equipment to their junior high school by using the system 100 for ranking their competition and the awarding of prizes.

One of the friends, acting as a competition event 121 creator provides input to the system 100 via their client device 400 describing the competition event 121 and one or more competition tasks 122 of the competition event 121 and initially sends out a challenge to her friend, to form a group of at least 6 people who want to donate sports equipment to their junior high school.

The friend accepts the challenge by, selecting the link of acceptance. The link will take them to the system 100 website or application download and installation website where they login, or create a new account with the email, or message phone number used to challenge them and become users 101 of the system 100.

Once logged into their account they view the sports equipment challenge from their friend. They may select other individuals, which may also be users 101, to become members of a group 125 from their Facebook friends, contacts, etc.

A message goes out from the system 100 to the prospective members, asking them to join the group 125.

If the individual selects yes to join link, they are taken to the system 100 site to login or register as new user 101.

They then can view the competition event 121 and competing group 125 members (users 101) via their client device 400.

The time, number, ratio, or any other ranking criteria may be used to rank the users 101 and their groups 125 by the completion proofs 123 that they submit of the users 101 performing the competition task 122 of the competition event 121 (such as photos or videos of the users 101 handing the sports director sports equipment, placing sports equipment in the donation box, or handing the sports equipment to the school principle, etc.

The prize selected by the competition event 121 creator user 101 is a healthy potluck gathering of both groups 125, a week after the end date. The losing group 125 prepares a healthy potluck for all to share.

As a second example, a competition may be between two swim clubs who compete with each other. The two clubs realize the more swim practices the better chance of winning the annual swim competition. A user 101 may provide input to the system 100 for a competition event 121 that includes a challenge for the winning group 125 who has the highest completion rates for membership attending swim practices. The winning swim club group 125 gets to have pizza at one of their get togethers donated by the losing club group 125.

As a third example, a member of a community who lives close to an area hit by a hurricane decides to use the system 100 to set up a competition event 121 having a purpose of volunteering to help the storm victims' animals. The competition task 122 of the competition event 121 is to identify places of temporary shelter for storm victims' animals, who are displaced by the hurricane, and cannot reside with their owners in their shelter. The community member user 101 challenges a friend to form a group 125, and take the challenge. Each group member user 101 makes a list of identified, and confirmed places for temporary animal shelters, and homes in their County. Each group member user 101 submits their completion proof 123 by posting their list to the system 100 where it may be stored in the system database 120 where the list type completion proofs 123 are accessible for viewing by other competing users 101 and optionally other individuals. The first group's creator 101B was able to get the local newspaper to commit to photograph the winning group 125, and write a story about their good work prior to the start of the competition event 121. The time, number, ratio, or any other ranking criteria may be used to rank the users 101 and their groups 125 by the completion proofs 123 that they submit of the users 101 performing the competition task 122 (in this case providing a still image or video of their list) of the competition event 121. The highest-ranking group 125 may have their photo and story written in the local newspaper.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), light emitting diode (LED) display, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random-access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD), light emitting diode (LED) display, or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A group competition generating method for any number of groups of competing users, each competing user of each group having a client device, the method including the steps of:
   receiving input describing a competition event, the competition event having a competition task;
   providing the competition event to two or more groups of one or more competing users via their respective client devices;
   receiving a completion proof of a competition task submitted by the one or more competing users via their respective client devices;
   accepting the completion proof as satisfying the competition task;
   ranking the two or more groups of competing users;
   wherein the groups of competing users are ranked by a ratio describing the number of competing users of a respective group that submit the completion proof to the total number of competing users in that respective group;
   wherein two or more groups having the same rank are ranked again by the number of competing users of each group that submit the completion proof for the competition task; and
   wherein each group has a respective group creator, wherein two more groups having the same rank are ranked again by the total number of competing users that submitted the completion proof that satisfied a competition task for every competition event created by the respective group creator of each group.

2. The method of claim 1, wherein the completion proof comprises a video.

3. The method of claim 1, wherein the completion proof comprises a still image.

4. The method of claim 1, wherein the groups of competing users are ranked by the earliest time at which at least one competing user of their respective group submits the completion proof.

5. The method of claim 1, wherein the groups of competing users are ranked by the earliest time at which all competing users of their respective group submits the completion proof.

6. The method of claim 1, further comprising the step of screening the completion proofs for a substantially matching completion proofs.

7. The method of claim 6, wherein any subsequent completion proof that substantially matches a first received completion proof is not accepted as satisfying the competition task.

8. The method of claim 1, wherein each competing user is ranked by a ratio describing a number of the completion proofs submitted by a respective competing user to a number of competition events provided to that respective competing user.

9. The method of claim 1, wherein the completion proofs are stored a database and are accessible for viewing by the competing users.

* * * * *